United States Patent
Kobayashi et al.

(10) Patent No.: US 9,531,973 B2
(45) Date of Patent: Dec. 27, 2016

(54) IMAGING APPARATUS AND IMAGING SYSTEM

(71) Applicant: CANON KABUSHIKI KAISHA, Tokyo (JP)

(72) Inventors: Daisuke Kobayashi, Kawaguchi (JP); Yoshikazu Yamazaki, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 24 days.

(21) Appl. No.: 14/596,124

(22) Filed: Jan. 13, 2015

(65) Prior Publication Data

US 2015/0124136 A1    May 7, 2015

Related U.S. Application Data

(63) Continuation of application No. 13/490,784, filed on Jun. 7, 2012, now Pat. No. 8,964,080.

(30) Foreign Application Priority Data

Jun. 10, 2011 (JP) .................. 2011-130266

(51) Int. Cl.
H04N 5/374 (2011.01)
(52) U.S. Cl.
CPC .................. *H04N 5/3742* (2013.01)

(58) Field of Classification Search
CPC .................................. H04N 5/3742
See application file for complete search history.

(56) References Cited

U.S. PATENT DOCUMENTS

2008/0273091 A1* 11/2008 Matsuo ............ G06F 17/5045
348/207.99

FOREIGN PATENT DOCUMENTS

JP    2009-206709 A    9/2009
JP    2011-166197 A    8/2011

* cited by examiner

*Primary Examiner* — Ahmed A Berhan
*Assistant Examiner* — Fayez Bhuiyan
(74) *Attorney, Agent, or Firm* — Canon U.S.A., Inc. IP Division (57) ABSTRACT

Because a conventionally known imaging apparatus includes a buffer element for each signal processing circuit, the number of buffer elements increases in proportion to the number of signal processing circuits. The delayed supply of a drive signal within a group of a plurality of signal processing circuits may require the operation timing margin to be set longer. In other words, the operational speed is hard to increase. First buffer circuits connected in series and second buffer circuits connected in parallel with the first buffer circuits are provided, and one second buffer circuit supplies a drive signal to a plurality of signal processing units.

15 Claims, 10 Drawing Sheets

FIG. 10 ional speed# IMAGING APPARATUS AND IMAGING SYSTEM

CROSS REFERENCE TO RELATED APPLICATIONS

The present application is a continuation of U.S. patent application Ser. No. 13/490,784, filed Jun. 7, 2012, entitled "IMAGING APPARATUS AND IMAGING SYSTEM", the content of which is expressly incorporated by reference herein in its entirety. Further, the present application claims the benefit of Japanese Patent Application No. 2011-130266 filed Jun. 10, 2011, which is hereby incorporated by reference herein in its entirety.

BACKGROUND OF THE INVENTION

Field of the Invention

The present invention relates to imaging apparatuses, and it particularly relates to an imaging apparatus having a signal processing circuit provided correspondingly to a column of a pixel array.

Description of the Related Art

A generally known imaging apparatus has a signal processing circuit for each column or a plurality of columns of a pixel array having an array of pixels in a matrix form and performs signal processing in parallel. The signal processing circuit performs processing such as Correlated Double Sampling (CDS) and offset adjustment, amplification, analog/digital conversion (A/D conversion) on signals output from pixels.

For example, Japanese Patent Laid-Open No. 2007-060036 discloses a method for supplying a drive signal that drives a plurality of signal processing circuits. According to Japanese Patent Laid-Open No. 2007-060036, buffer elements that transmit a drive signal are connected in series within a group of a plurality of signal processing circuits to reduce the peak current and the number of buffer elements.

However, the configuration described in Japanese Patent Laid-Open No. 2007-060036 has a buffer element for each signal processing circuit, which increases the number of buffer elements in proportional to the number of signal processing circuits. Moreover, the chip area increases when it is formed on a semiconductor substrate.

The delayed supply of a drive signal within a group of signal processing circuits may require the operation timing margin to be set longer. In other words, the operational speed is hard to increase.

SUMMARY OF THE INVENTION

An imaging apparatus according to an aspect of the present invention includes a pixel array, a plurality of signal processing units each of which is provided correspondingly to a column of the pixel array, and a drive signal transmitting unit which transmits a drive signal that drives the signal processing units. In this case, the drive signal transmitting unit includes a plurality of first buffer circuits and a plurality of second buffer circuits, an output terminal of one of the first buffer circuits is connected to input terminals of another one of the first buffer circuits and one of the second buffer circuits, and the second buffer circuit supplies the drive signal of the plurality of signal processing units.

An imaging apparatus according to another aspect of the present invention includes a pixel array, a plurality of signal processing units each of which includes S (a natural number that is larger than 2) signal processing units, and a drive signal transmitting unit which transmits a drive signal that drives the signal processing units. In this case, the drive signal transmitting unit includes a plurality of first buffer circuits and a plurality of second buffer circuits, an output terminal of one of the first buffer circuits is connected to input terminals of another one of the first buffer circuits and one of the second buffer circuits, and each of the second buffer circuits supplies the drive signal to the signal processing units that are mutually different.

Further features of the present invention will become apparent from the following description of exemplary embodiments with reference to the attached drawings.

DESCRIPTION OF THE EMBODIMENTS

Figure 1:
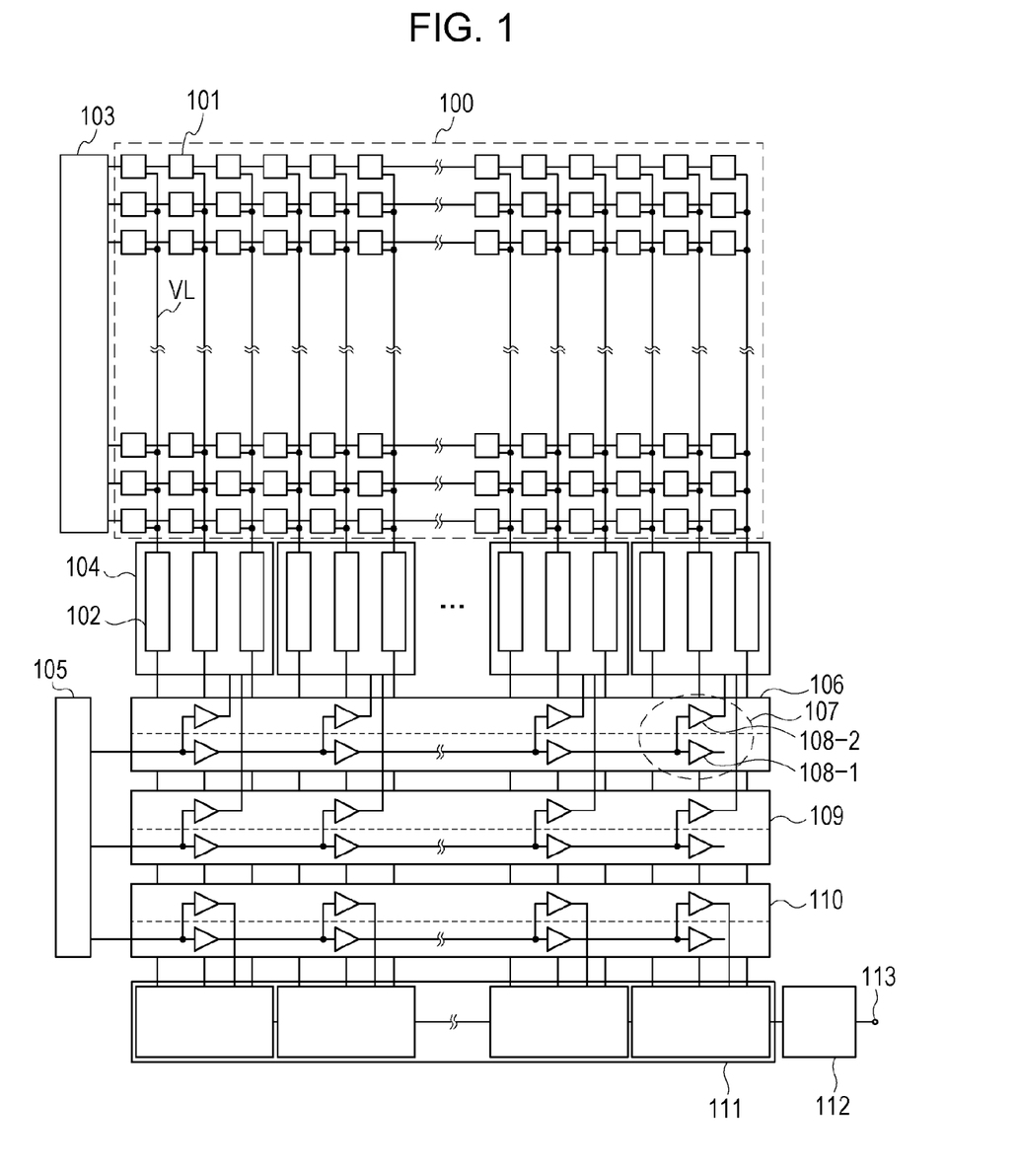
FIG. 1 illustrates an exemplary configuration of an imaging apparatus according to a first embodiment.

FIG. 1 illustrates an exemplary configuration of an imaging apparatus according to a first embodiment of the present invention. An exemplary configuration having a pixel array 100 of m rows by n columns of pixels 101, and signal processing circuits 102 in respective columns of the pixel array 100 will be described below.

Each of the pixels 101 includes a photoelectric conversion unit and outputs a signal according to the charge amount acquired by photoelectric conversion to a signal line VL. A row select circuit 103 controls an operation of the pixels 101 in rows and controls operations including reset of the pixels 101 and/or reading signals. The signal processing circuit group 104 that is a signal processing unit group includes a plurality of signal processing circuits 102 and processes a signal transmitted through the signal line VL. The signal processing circuits 102 may have functions of noise reduction with CDS, signal amplification, and A/D conversion. A configuration having an A/D conversion function may include a digital memory such as an SRAM (Static Random Access Memory) for temporarily holding a digital signal resulting from A/D conversion.

The signal processing circuits 102 operate in response to supply of a drive signal. A drive signal generated in a drive signal generating unit 105 is transmitted to the signal processing circuits 102 through drive signal transmitting units 106 and 109. In this case, each of the signal processing circuits 102 which are signal processing units includes an A/D converter and a digital memory, which are driven with different drive signals, for example. As illustrated in FIG. 1, a common drive signal is supplied to the plurality of signal processing circuits 102 included in one signal processing circuit group 104.

A signal output from one of the signal processing circuits 102 is transmitted to an output unit 112 through a transfer unit 111 and is transmitted from an output terminal 113 to a subsequent circuit. The transfer unit 111 includes a shift register or a decoder corresponding to a column of the pixel array 100 and has a function of selecting a signal processing circuit 102 to transmit a signal to the output unit 112. The transfer unit 111 operates in response to a drive signal generated in the drive signal generating unit 105 and supplied through the drive signal transmitting unit 110.

Next, the drive signal transmitting units 106, 109, and 110 will be described in detail. The drive signal transmitting unit 106 has a plurality of buffer blocks 107. One buffer block 107 is provided for each of the signal processing circuit groups 104. Each of the buffer blocks 107 includes a first buffer circuit 108-1 and a second buffer circuit 108-2. The output of the first buffer circuit is connected to the input of the first and second buffer circuits included in another buffer block 107. The output of the second buffer circuit 108-2 is given in parallel to a plurality of signal processing circuits of the corresponding signal processing circuit group 104. In other words, the drive signal transmitting unit 106 is connected to the plurality of first buffer circuits 108-1 in series, and the second buffer circuit 108-2 is provided in parallel with the first buffer circuit 108-1. That is, any one of the first buffer circuits 108-1 supplies a drive signal to another first buffer circuit 108-1 and the corresponding second buffer circuit 108-2.

The drive signal transmitting unit 109 includes first and second buffer circuits, like the drive signal transmitting unit 106. The second buffer circuit supplies a drive signal to the plurality of signal processing circuits 102.

Figure 2:
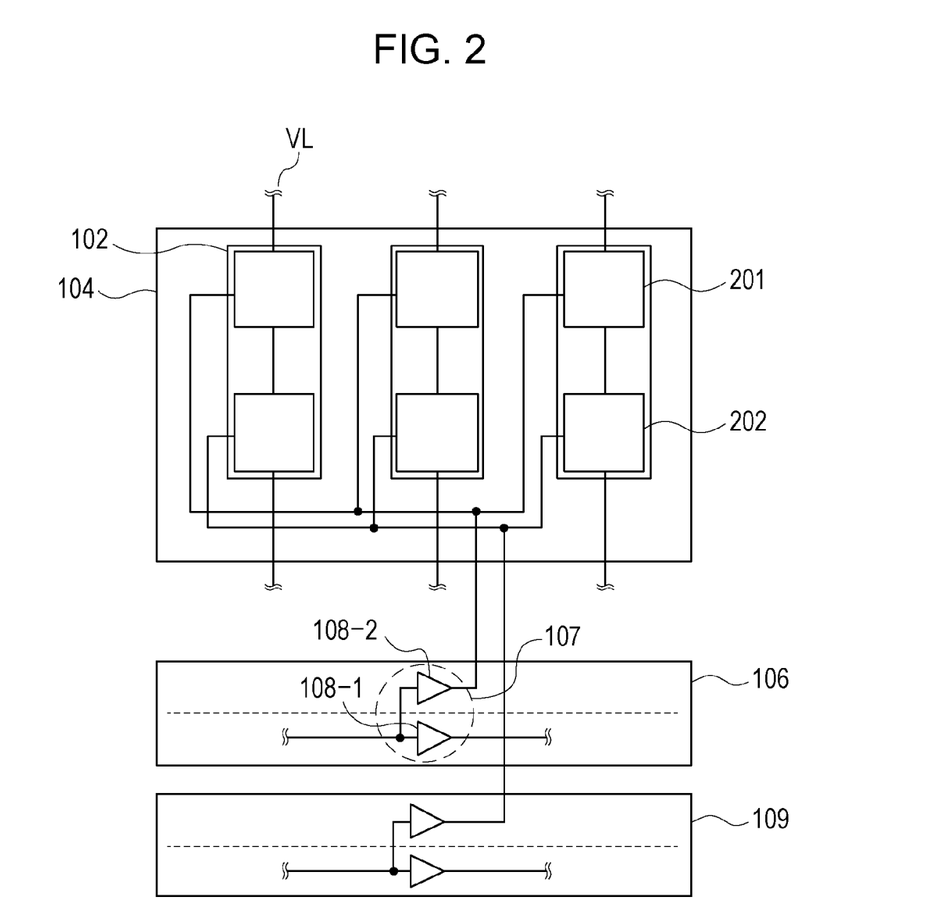
FIG. 2 illustrates an exemplary configuration of a signal processing unit and a drive signal transmitting unit according to the first embodiment.

FIG. 2 is a block diagram illustrating a connection relationship between any one of the signal processing circuit groups 104 and the buffer blocks of the drive signal transmitting units 106 and 109 associated thereto. In this case, the signal processing circuit group 104 includes three signal processing circuits 102, for example. Each of the signal processing circuits 102 includes an A/D converter 201 and a digital memory 202. A second buffer circuit of the drive signal transmitting unit 109 supplies a drive signal to the three digital memories 202. The second buffer circuit of the drive signal transmitting unit 106 supplies a drive signal to three A/D converters 201.

The drive signal transmitting unit 110 that is a third drive signal transmitting unit includes first and second buffer circuits, like the drive signal transmitting unit 106. The second buffer circuit supplies a drive signal to a transfer block. Each transfer block may include a plurality of shift registers, for example, and a common drive signal is supplied to them.

According to the configuration of this embodiment, because the second buffer circuit supplies a drive signal to a plurality of signal processing circuits and transfer blocks, the operation timing margin may be reduced, and the increase of the number of buffer circuits may be prevented. The signal processing circuits or transfer blocks to which a drive signal is supplied from one second buffer circuit operate simultaneously. However, the signal processing circuits to which drive signals are supplied from different second buffer circuits operate in different timings, which may suppress peak current.

Supplying a drive signal from a common second buffer circuit to the plurality of signal processing circuits 102 is particularly effective when the signal processing circuits 102 include A/D converters and digital memories. This is because a comparator of the A/D converter may be required to operate in synchronism with and digital memories and therefore the phase relationship between the drive signals may be required to maintain. A in this embodiment, because the buffer blocks of the drive signal transmitting units 106 and 109 supply drive signals to the same signal processing circuit group 104, the phase relationship between the drive signals may be maintained in the signal processing circuit group 104. In other words, the signal phases may be controlled more easily. According to this embodiment, the drive signal transmitting unit 106 that is a first drive signal transmitting unit and the drive signal transmitting unit 109 that is a second drive signal transmitting unit include an equal number of first buffer circuits, for example, which allows an equal delay time occurring between them. The expression "equal delay time" refers to a phase difference within one cycle between signals transmitted by two drive signal transmitting units where the drive signals has F [Hz].

Next, the number S of the signal processing circuit groups 104 will be described in a case where the signal processing circuits 102 include A/D converters. In a known A/D converter, an analog signal to be converted and a reference signal which changes slopewise with the passage of time are input to a comparator, and the number of clocks input to a counter is counted during the period from the start of a change of the reference signal to inversion of the magnitude relationship between the analog signal and the reference signal. When a plurality of A/D converters having such a configuration are provided and clock signals to be given to the A/D converters delay one cycle or more, different digital signals are generated from analog signals at an equal level. This may appear as a shading in an image in the row direction in an imaging apparatus.

Figure 3:
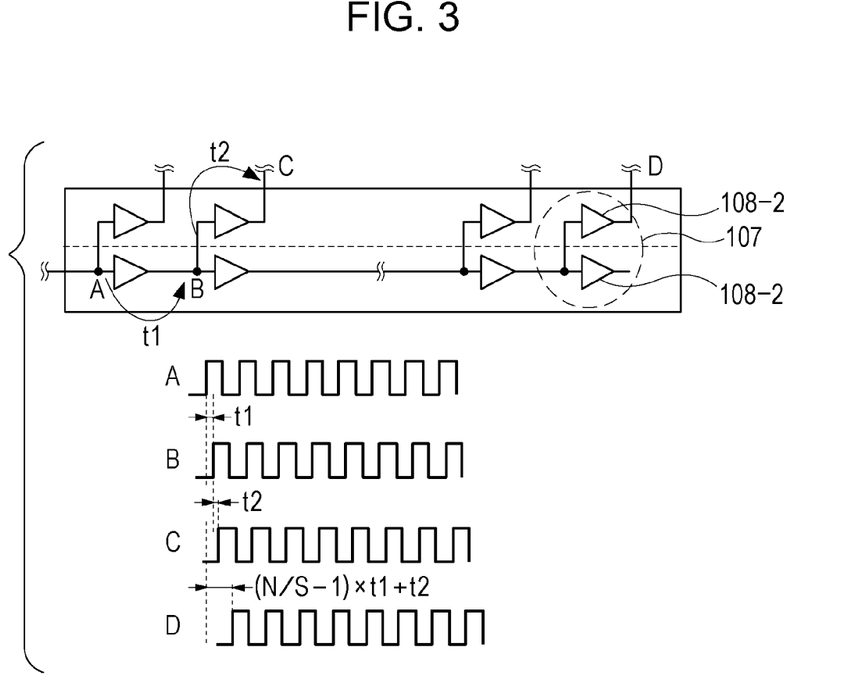
FIG. 3 illustrates a phase relationship between signals according to the first embodiment.

FIG. 3 illustrates a drive signal transmitting unit and waveforms of signals at nodes A to D. It is assumed here, for example, that a signal to be transmitted by the drive signal transmitting unit is a clock signal for controlling the counting operation in the A/D converter. When the clock signals have a frequency of F [Hz] and a phase difference equal to one cycle, that is, 1/F [sec] or more occurs among all of the signal processing circuits 102, the A/D conversion results may differ among the signal processing circuits. A case will be considered under this constraint, where the delay time that occurs in the first buffer circuit is t1 [sec] and the delay time that occurs in the second buffer circuit is t2 [sec], and N signal processing circuits 102 exist.

It is assumed that the node A receives a drive signal output from the drive signal generating unit 105. Further assuming that the node B is one subsequent stage of the first buffer circuit, the node C is a node through the node B, and the node D is a node through the final second buffer circuit, a shorter delay time than 1/F [sec] may be required between the node A and node D because of the constraint above. This may be mathematically expressed as Expression (1).

$$(N/S-1) \times t1 + t2 < 1/F \quad (1)$$

Designing such that the number S of the signal processing circuit groups 104 is a natural number that satisfies Expression (1) may prevent the occurrence of a shading. The condition is preferably satisfied though clock signals for A/D converters have been described for illustration purpose.

Figure 4:
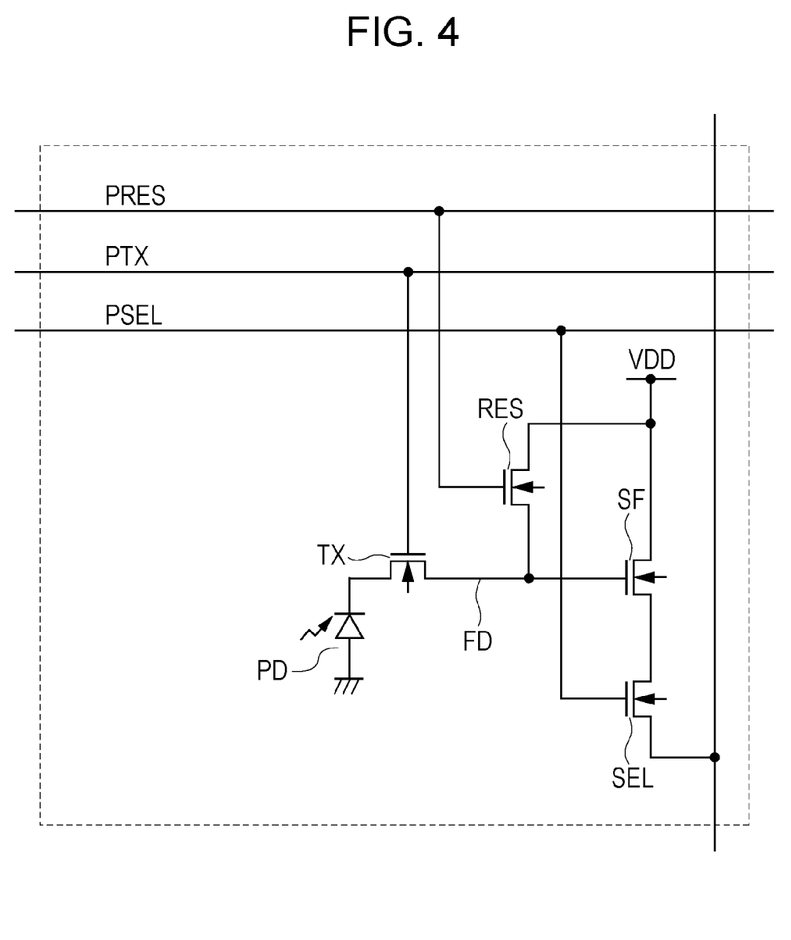
FIG. 4 is an equivalent circuit diagram illustrating an exemplary configuration of a pixel.

FIG. 4 is an equivalent circuit diagram illustrating an exemplary configuration of one of the pixels 101. The pixel 101 has a photoelectric conversion unit PD, a transfer transistor TX, a reset transistor RES, an amplifier transistor SF, and a select transistor SEL. When the transfer switch TX is driven by the transfer pulse PTX and is brought into conduction, charges generated in the photoelectric conversion unit PD are transferred to a node FD of a control electrode of the amplifier transistor SF. When the reset switch RES is driven by a reset pulse PRES and is brought into conduction, the node FD is reset to the power supply voltage VDD. When the row select switch SEL is driven by a row select pulse PSEL and is brought into conduction, the amplifier transistor forms a constant current source and a source follower circuit, not illustrated, and outputs a signal according to the potential of the node FD to the signal line VL.

Figure 5:
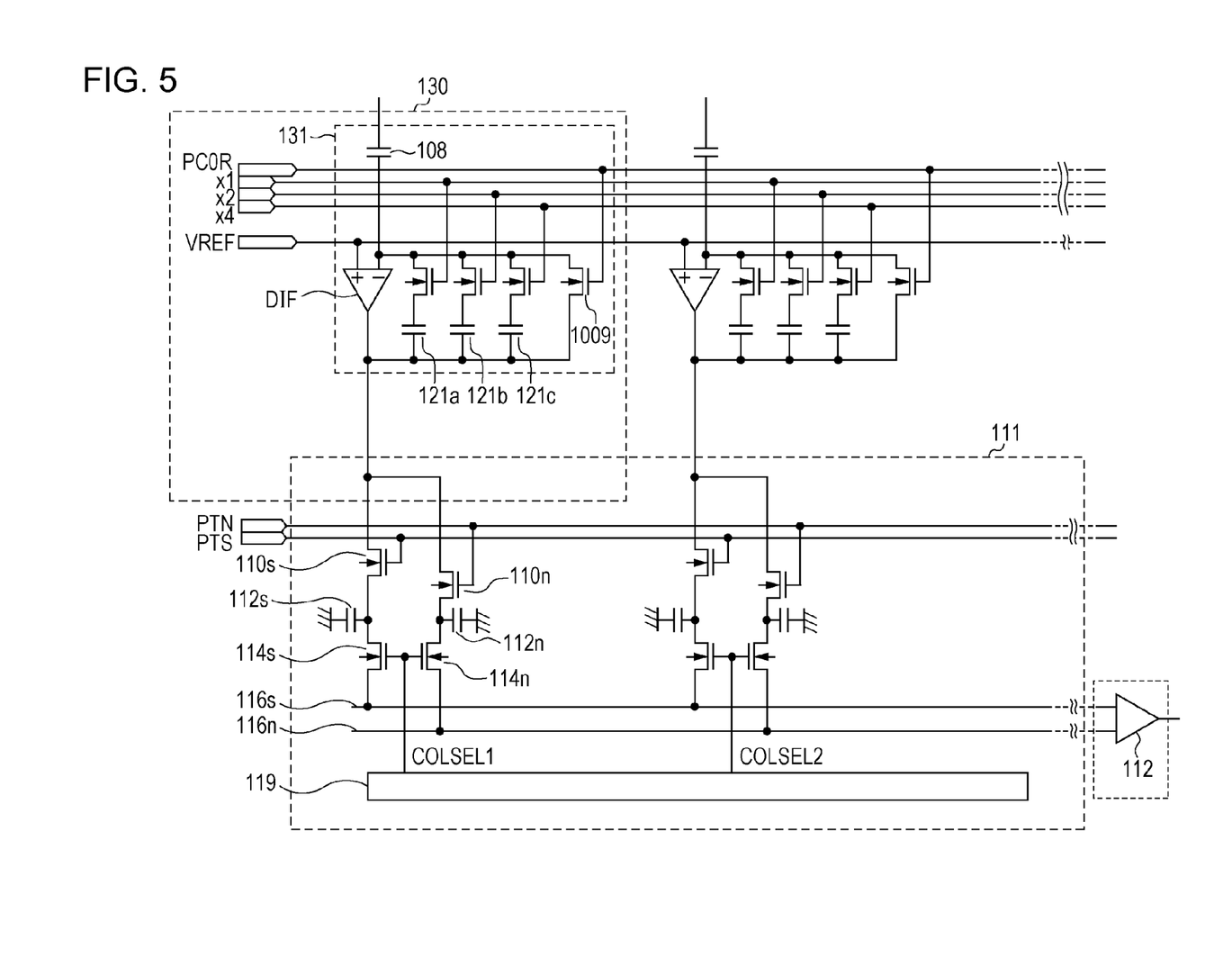
FIG. 5 illustrates an exemplary configuration of an amplifier and a transfer unit included in the signal processing circuit.

FIG. 5 illustrates an exemplary configuration of an amplifier and a transfer unit included in the signal processing circuit. The amplifier 130 includes a differential amplifier DIF, an input capacitance C0, feedback capacitances 121a to 121c, and a short switch 1009. The feedback capacitance which connects between an inverting input terminal and an output terminal of the differential amplifier DIF may be selected with a signal x 1, x 2, or x 4. The gain of the amplifier 130 depends on the ratio between the capacitance and capacitance value of the input capacitance C0. When the short switch 1009 is brought into conduction, the differential amplifier DIF operates as a voltage follower. In this case, the output and input capacitances may be used to clamp the signal output from the pixel. This allows reduction of noise occurring in the pixel.

The transfer unit includes holding capacitances 112s and 112n. One of them is caused to hold the offset of the amplifier 130, and the other is caused to hold the signal amplified by the amplifier 130. Removing the difference between them by the differential amplifier provided in the output unit, for example, may reduce the offset of the amplifier 130. When the signal processing circuit includes an A/D converter, it may be processed as a digital signal by eliminating the holding capacitance.

As described above, according to this embodiment, the increase of the number of buffer elements may be suppressed, and the operational speed may be increased.

Figure 6:
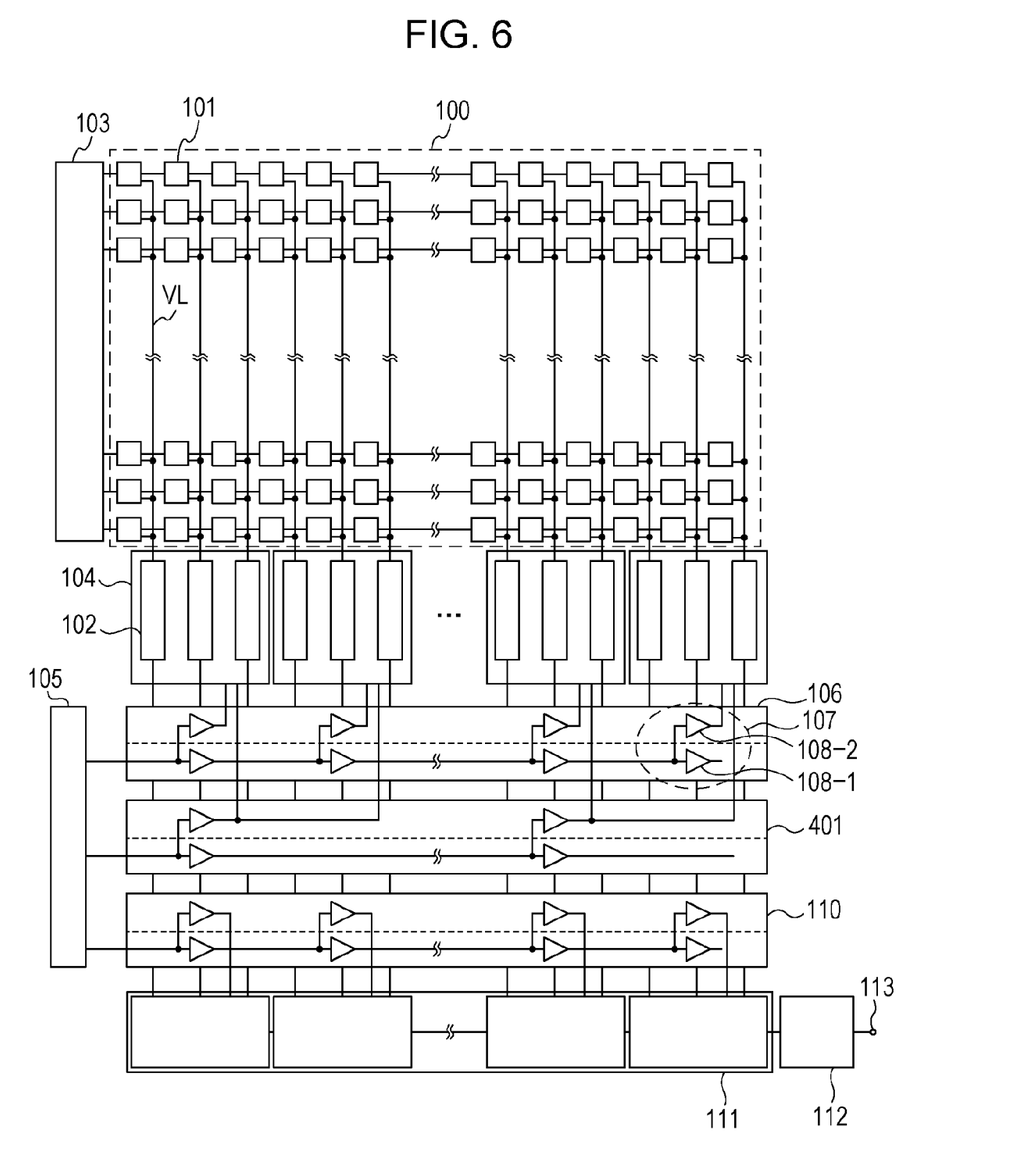
FIG. 6 illustrates an exemplary configuration of an imaging apparatus according to a second embodiment.

FIG. 6 illustrates an exemplary configuration of an imaging apparatus according to a second embodiment of the present invention. It is different from the configuration illustrated in FIG. 1 in that the drive signal transmitting unit 109 is replaced by a drive signal transmitting unit 401. The differences from the first embodiment will be described below.

According to the first embodiment, one buffer block of the drive signal transmitting unit 109 is provided for the signal processing circuits 102 in three columns. According to this embodiment on the other hand, one buffer block of the drive signal transmitting unit 401 is provided for the signal processing circuits 102 in N/2S columns. According to the first embodiment, a drive signal transmitted through the drive signal transmitting unit 109 may be required to maintain a phase relationship with a high frequency drive signal transmitted through the drive signal transmitting unit 106. For that, the drive signal transmitting unit 109 has one buffer block for the equal number of signal processing circuits 102 to that of the drive signal transmitting units 106.

Figure 7:
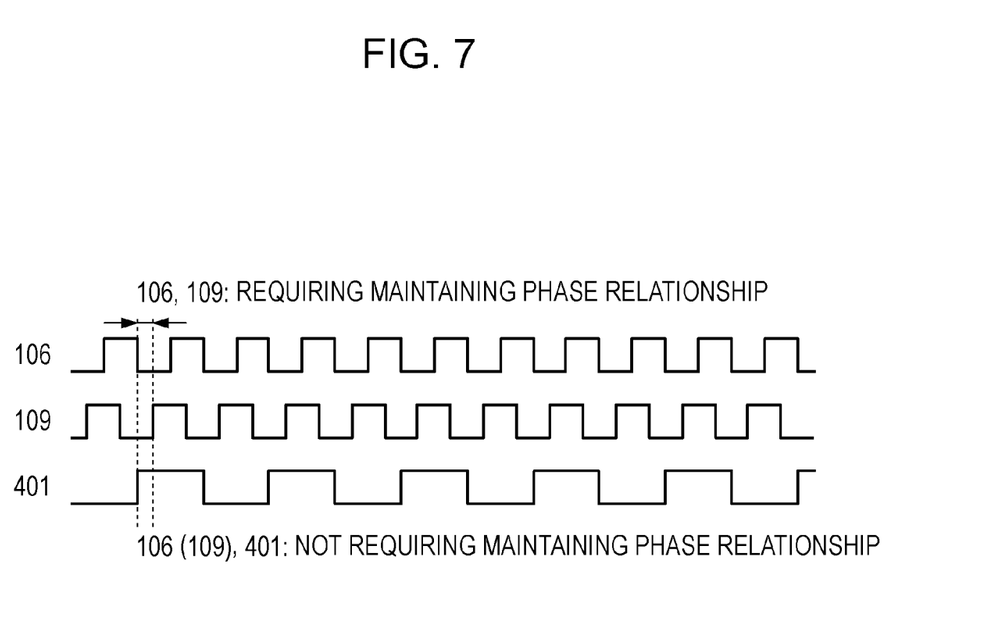
FIG. 7 illustrates a phase relationship between signals according to the second embodiment.

On the other hand, when a signal transmitted through the drive signal transmitting unit 401 has a low frequency, a smaller number of buffer blocks than that of the drive signal transmitting units 106 for transmitting high frequency drive signals may be included in the drive signal transmitting unit 401. The same is true in a case where drive signals transmitted by the different drive signal transmitting unit are not required to have the same phase. FIG. 7 illustrates waveforms of drive signals transmitted through the drive signal transmitting units 106, 109, and 401, for comparison with the first embodiment. A phase relationship is maintained between drive signals transmitted by the drive signal transmitting units 106 and 109. On the other hand, the phase relationship is not maintained between the drive signals transmitted by the drive signal transmitting units 106 and 401. Examples of drive signals to be transmitted through the drive signal transmitting unit 401 may include a signal required for an operation by a CDS circuit when the signal processing circuit 102 includes the CDS circuit, a signal for resetting a comparator when an ADC is included, and a signal for resetting a digital memory or latching the count value.

Figure 8:
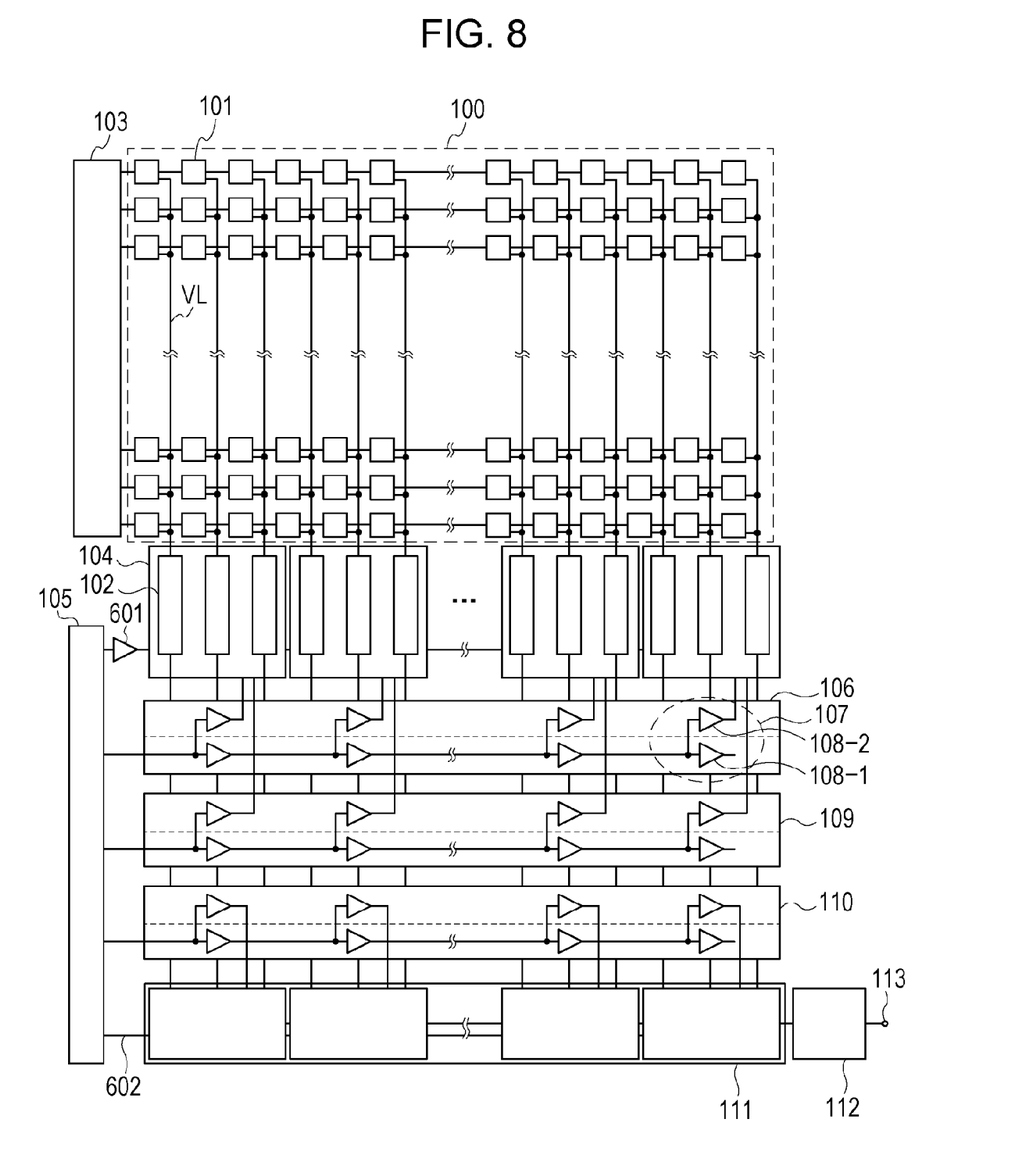
FIG. 8 illustrates another exemplary configuration of an imaging apparatus according to the second embodiment.

In some configurations of the signal processing circuit 102, as illustrated in FIG. 8, one buffer circuit 601 or 602 may supply a signal to the signal processing circuits 102 in all columns. Examples of the signal may include a signal for setting a gain of the amplifier included in the signal processing circuit 102, a signal for designating an operation mode, and a start pulse of the shift register.

In other words, the number of buffer circuits included in the drive signal transmitting units may be set in accordance with the type of a drive signal, instead of transmission of all signals supplied to the signal processing circuits 102 with an equal number of buffer blocks. Thus, the area to be occupied by the buffer circuits and the power consumption may be optimized.

Figure 9:
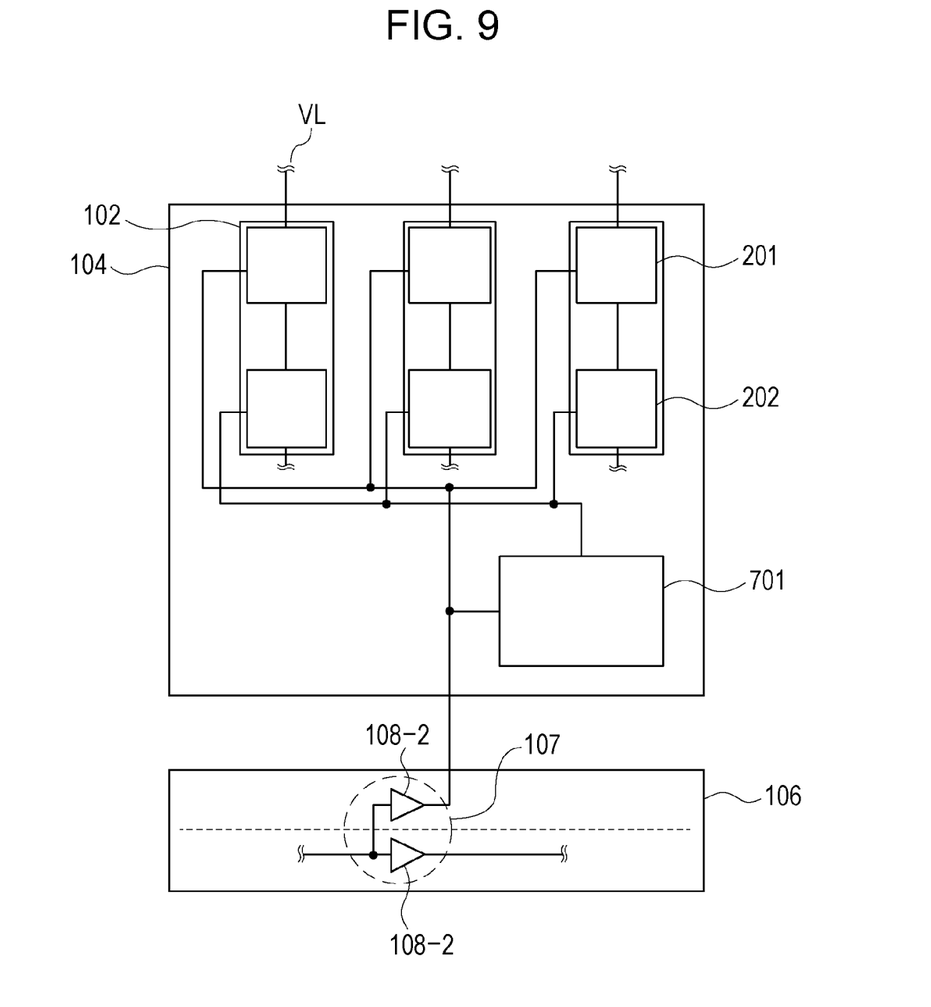
FIG. 9 illustrates an exemplary configuration of a signal processing circuit and a drive signal transmitting unit according to a third embodiment.

With reference to FIG. 9, a third embodiment of the present invention will be described.

FIG. 9 illustrates an exemplary configuration of the signal processing circuit group 104. A phase management may sometimes be required in association with a signal resulting from multiplication or division of a drive signal supplied from the drive signal transmitting unit 106. Accordingly, this embodiment further includes a frequency converting unit 701.

Because buffer circuits included in drive signal units have variations and different parasitic loads, maintaining a phase relationship between drive signals is difficult particularly when the drive signals have a high frequency. According to this embodiment on the other hand, the use of the frequency converting unit 701 facilitates maintaining a phase relationship. The frequency converting unit may be a PLL circuit or clock division circuit, for example.

The imaging apparatuses according to the aforementioned embodiments may be formed on a semiconductor substrate, for example. The drive signal generating unit may be provided on a separate semiconductor substrate from that for the pixel array, signal processing units, and drive signal transmitting units, without requiring all elements provided on one substrate.

Figure 10:
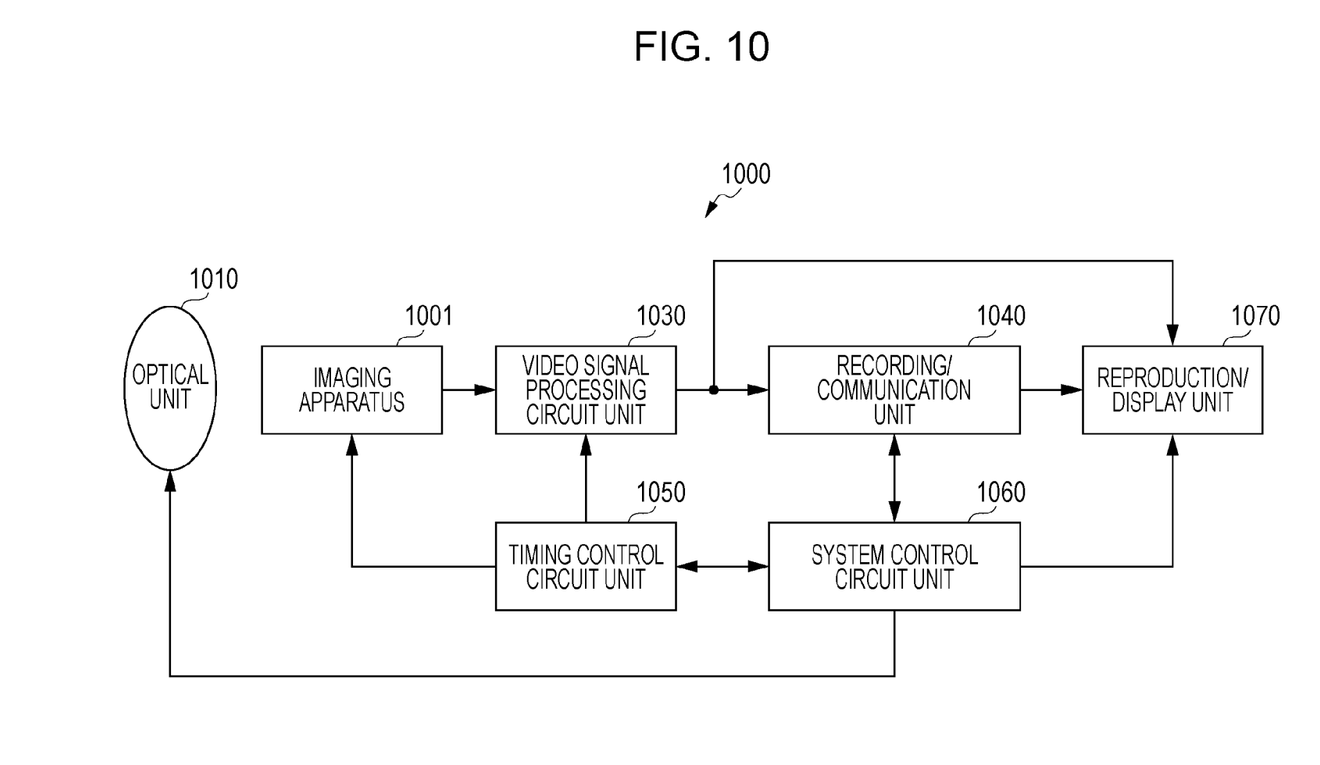
FIG. 10 illustrates an exemplary configuration of an imaging system according to a fourth embodiment.

Next, an imaging system according to a fourth embodiment will be described schematically with reference to FIG. 10.

An imaging system 1000 may include an optical unit 1010, an imaging apparatus 1001, a video signal processing control unit 1030, a recording/communication unit 1040, a timing control unit 1050, a system control unit 1060, and a reproduction/display unit 1070, for example. The imaging apparatus 1001 may be the imaging apparatus having described according to any one of the aforementioned embodiments.

The optical unit 1010 which is an optical system such as a lens forms an image of light from a subject on a pixel array in which a plurality of pixels are aligned two-dimensionally of the imaging apparatus 1001 and forms an image of the subject. The imaging apparatus 1001 outputs a signal according to the light formed on the pixel unit at a timing based on a signal from the timing control unit 1050.

A signal output from the imaging apparatus 1001, is input to the video signal processing control unit 1030 that is a video signal processing unit. The video signal processing control unit 1030 performs processing such as AD conversion on an input electric signal by a method determined by a program. The signal resulting from processing by the video signal processing control unit is fed to the recording/communication unit 1040 as image data. The recording/communication unit 1040 passes the signal for forming an image to the reproduction/display unit 1070, and the reproduction/display unit 1070 is caused to reproduce/display a moving picture or a still image. In response to a signal from the video signal processing control unit 1030, the recording/communication unit also communicates with the system control unit 1060 and records an signal for forming an image on a recording medium, not illustrated.

The system control unit 1060 controls over an operation of the imaging system and controls the driving of the optical unit 1010, timing control unit 1050, recording/communication unit 1040, and reproduction/display unit 1070. The system control unit 1060 further includes a storage device, not illustrated, that is a recording medium, for example, and a program for controlling an operation of the imaging system is recorded therein. The system control unit 1060 supplies a signal for switching the drive mode in accordance with an operation by a user, for example, within the imaging system. More specifically, the user operation may be a change of a row to be read or to be reset, a change of the field angle with an electronic zoom, the shift of the field angle with electronic image stabilization, for example.

The timing control unit 1050 controls the driving timing for the imaging apparatus 1001 and video signal processing control unit 1030 under the control of the system control unit 1060 that is a control unit.

The video signal processing control unit 1030 holds a correction coefficient according to any one of the embodiment and performs correction processing on a signal output from the imaging apparatus 1001.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An imaging apparatus comprising:
    a pixel array;
    a first signal processing group and a second signal processing group each of which includes signal processing units each of which is provided correspondingly to a column of the pixel array, the signal processing unit of the first signal processing group being commonly connected to a first node, and the signal processing unit of the second signal processing group being commonly connected to a second node;
    a drive signal generating unit which generates a drive signal that drives the signal processing units; and
    a drive signal transmitting unit including buffer circuits each of which transmits the drive signal, the buffer circuits including first buffer circuits and second buffer circuits,
    wherein an output signal of one of the second buffer circuits is given to the first node, and an output signal of another one of the second buffer circuits is given to the second node,
    wherein an output terminal of first one of the first buffer circuits is connected to an input terminal of the one of the second buffer circuits and an input terminal of second one of the first buffer circuits, and an output terminal of the second one of the first buffer circuits is connected to an input terminal of the another one of the second buffer circuits, and
    wherein a number of all of the buffer circuits supplying the drive signal to the second node is larger than a number of all of the buffer circuits supplying the drive signal to the first node, and
    wherein the signal processing unit of the first processing group have an equal number of the buffer circuits to each other, and the signal processing units of the second processing group have an equal number of the buffer circuits to each other.

2. The imaging apparatus according to claim 1, wherein the drive signal transmitting unit includes a first drive signal transmitting unit and a second drive signal transmitting unit; and
    the first drive signal transmitting unit and the second drive signal transmitting unit have an equal number of the second buffer circuits.

3. The imaging apparatus according to claim 1, wherein:
    the drive signal transmitting unit includes a first drive signal transmitting unit and a second drive signal transmitting unit;
    the second drive signal transmitting unit includes the second buffer circuits less than the first drive signal transmitting unit; and
    the second drive signal transmitting unit transmits a drive signal with a lower frequency than that of the first drive signal transmitting unit.

4. The imaging apparatus according to claim 3, further comprising a third drive signal transmitting unit which supplies the drive signal to the plurality of signal processing circuits,
    wherein the third drive signal transmitting unit transmits a drive signal with a lower frequency than that of the second drive signal transmitting unit.

5. The imaging apparatus according to claim 1, wherein the drive signal transmitting unit includes a first drive signal transmitting unit and a second drive signal transmitting unit; and
    the first drive signal transmitting unit and the second drive signal transmitting unit have an equal delay time.

6. The imaging apparatus according to claim 1, further comprising a frequency converting unit which converts the frequency of the drive signal supplied from the second buffer circuit.

7. The imaging apparatus according to claim 6, wherein the frequency converting unit includes a clock division circuit or a PLL circuit.

8. The imaging apparatus according to claim 1, wherein the signal processing unit has at least one function of noise reduction, amplification, and A/D conversion on a signal output from the pixel array.

9. The imaging apparatus according to claim 1, further comprising:
an output unit; and
a transfer unit which transfers a signal output from the signal processing unit to the output unit,
wherein the transfer unit selects the signal processing unit to transfer a signal to the output unit through a shift register or a decoder.

10. The imaging apparatus according to claim 9, wherein the drive signal transmitting unit further supplies the drive signal to the transfer unit.

11. The imaging apparatus according to claim 1, wherein the imaging apparatus is formed on a semiconductor substrate.

12. An imaging system comprising:
an imaging apparatus;
an optical system which forms an image on the pixel array; and
a video signal processing unit which processes a signal output from the imaging apparatus and to generate image data,
the imaging apparatus comprises:
a pixel array
a first signal processing group and a second signal processing group, each of which includes signal processing units each of which is provided correspondingly to a column of the pixel array, the signal processing unit of the first signal processing group being commonly connected to a first node, and the signal processing unit of the second signal processing group being commonly connected to a second node:
a drive signal transmitting unit including buffer circuits each of which transmits the drive signal, the buffer circuits including first buffer circuits and second buffer circuits,
wherein an output signal of one of the second buffer circuits is given to the first node, and an output signal of another one of the second buffer circuit is given to the second node,
wherein an output terminal of first one of the first buffer circuits is connected to an input terminal of the one of the second buffer circuits and an input terminal of second one of the first buffer circuits, and an output terminal of the second one of the first buffer circuits is connected to an input terminal of the another one of the second buffer circuits, and
wherein a number of all of the buffer circuits supplying the drive signal to the second node is larger than a number of all of the buffer circuits supplying the drive signal to the first node, and
wherein signal processing units of the first processing group have an equal number of the buffer circuits to each other, and the signal processing units of the second processing group have an equal number of the buffer circuits to each other.

13. The imaging apparatus according to claim 1, wherein each of the plurality of signal processing units has an A/D converter configured to convert a signal output from the pixel array to a digital signal.

14. The imaging apparatus according to claim 13, wherein the first and second signal processing groups each include S (a natural number that is larger than 2) signal processing units,
wherein the A/D converter operates based on a clock signal, and
wherein the S satisfies a relationship of $$(N/S-1) \times t1 + t2 < 1/F$$

where the number of the signal processing groups is equal to N;
a delay time of a signal by the first buffer circuits is t1;
a delay time of a signal by the second buffer circuits is t2; and
a frequency of the clock signal is F.

15. The imaging apparatus according to claim 1,
wherein a phase relationship between drive signals that are input to each of the plurality of signal processing units is equally maintained in the first signal processing group.

* * * * *